United States Patent
Balnis et al.

(10) Patent No.: US 10,836,209 B2
(45) Date of Patent: Nov. 17, 2020

(54) TIRE SIDEWALLS INCLUDING HIGH MOLECULAR WEIGHT WAXES

(71) Applicant: Bridgestone Americas Tire Operations, LLC, Nashville, TN (US)

(72) Inventors: Craig Balnis, Akron, OH (US); Emily Welles, Aiken, SC (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 103 days.

(21) Appl. No.: 15/536,873

(22) PCT Filed: Dec. 17, 2015

(86) PCT No.: PCT/US2015/066286
§ 371 (c)(1),
(2) Date: Jun. 16, 2017

(87) PCT Pub. No.: WO2016/100618
PCT Pub. Date: Jun. 23, 2016

(65) Prior Publication Data
US 2017/0361654 A1     Dec. 21, 2017

Related U.S. Application Data

(60) Provisional application No. 62/093,023, filed on Dec. 17, 2014.

(51) Int. Cl.
*B60C 1/00* (2006.01)
*B60C 13/00* (2006.01)
(Continued)

(52) U.S. Cl.
CPC .............. *B60C 1/0025* (2013.01); *B60C 1/00* (2013.01); *B60C 13/00* (2013.01); *B60C 13/009* (2013.01); *B60C 19/00* (2013.01); *C08L 9/00* (2013.01); *C08L 21/00* (2013.01); *B60C 13/002* (2013.01); *B60C 2001/005* (2013.01); *B60C 2013/005* (2013.01); *C08K 3/013* (2018.01);
(Continued)

(58) Field of Classification Search
CPC ......... B60C 1/0025; B60C 1/00; B60C 13/00; C08L 9/00
See application file for complete search history.

(56) References Cited

U.S. PATENT DOCUMENTS 3,826,735 A    7/1974  Shinomura
3,838,080 A *  9/1974  Shinomura ............... C08L 9/06
                                              524/487

(Continued)

FOREIGN PATENT DOCUMENTS

EP    0867472 A1    9/1998
JP    H04-53847 A   2/1992
(Continued)

OTHER PUBLICATIONS

Ernst Krendlinger, et al., Waxes, in Ullmann's Encyclopedia of Industrial Chemistry, published online 2015, 63 pages in length.*
(Continued)

*Primary Examiner* — Nicholas E Hill
(74) *Attorney, Agent, or Firm* — Meredith E. Hooker; Arthur M. Reginelli

(57) ABSTRACT

A tire sidewall comprising a vulcanized rubber and a high molecular weight wax.

16 Claims, 1 Drawing Sheet

(51) Int. Cl.
*B60C 19/00* (2006.01)
*C08L 9/00* (2006.01)
*C08L 21/00* (2006.01)
*C08K 3/013* (2018.01)
*C08K 5/10* (2006.01)
*C08L 19/00* (2006.01)
*C08L 61/18* (2006.01)

(52) U.S. Cl.
CPC .............. *C08K 5/10* (2013.01); *C08L 19/006* (2013.01); *C08L 61/18* (2013.01)

(56) References Cited

U.S. PATENT DOCUMENTS

| | | | |
|---|---|---|---|
| 5,296,129 A | | 3/1994 | Ikeda et al. |
| 6,201,049 B1* | | 3/2001 | Sakamoto ................ C08K 5/18 524/186 |
| 6,639,003 B2 | | 10/2003 | Borsinger et al. |
| 2003/0069346 A1* | | 4/2003 | Borsinger ................. B60C 1/00 524/487 |
| 2006/0124218 A1 | | 6/2006 | Nahmias Nanni et al. |
| 2008/0009595 A1* | | 1/2008 | Taguchi ................. B60C 1/0025 526/234 |
| 2008/0083479 A1* | | 4/2008 | Agostini ............. B60C 17/0009 152/517 |
| 2008/0110544 A1 | | 5/2008 | Nakamura |
| 2008/0202660 A1 | | 8/2008 | Abdallah et al. |
| 2016/0102194 A1 | | 4/2016 | Kamada |
| 2016/0108211 A1 | | 4/2016 | Busch et al. |
| 2016/0108212 A1 | | 4/2016 | Busch et al. |
| 2016/0215125 A1* | | 7/2016 | Kato ..................... B60C 1/0025 |
| 2016/0368324 A1* | | 12/2016 | Miyazaki ................ B60C 11/00 |
| 2017/0015812 A1* | | 1/2017 | Miyazaki .................. B60C 1/00 |

FOREIGN PATENT DOCUMENTS

| | | |
|---|---|---|
| JP | H06-329993 A | 11/1994 |
| JP | 2003-292684 A | 10/2003 |
| JP | 2009-102633 A | 5/2009 |
| JP | 2013-155352 A | 8/2013 |
| JP | 2014-65879 A | 4/2014 |
| WO | 2004014996 A1 | 2/2004 |
| WO | 2012023026 A2 | 2/2012 |

OTHER PUBLICATIONS

Dusan Jeremic, "Polyethylene," in Ullmann's Encyclopedia of Industrial Chemistry (published online Aug. 1, 2014).*
English translation of JPH0453847, 8 pp. (Feb. 21, 1992).
International Search Report and Written Opinion, dated Apr. 7, 2016, International Application PCT/US2015/066286, pp. 1-15.

* cited by examiner

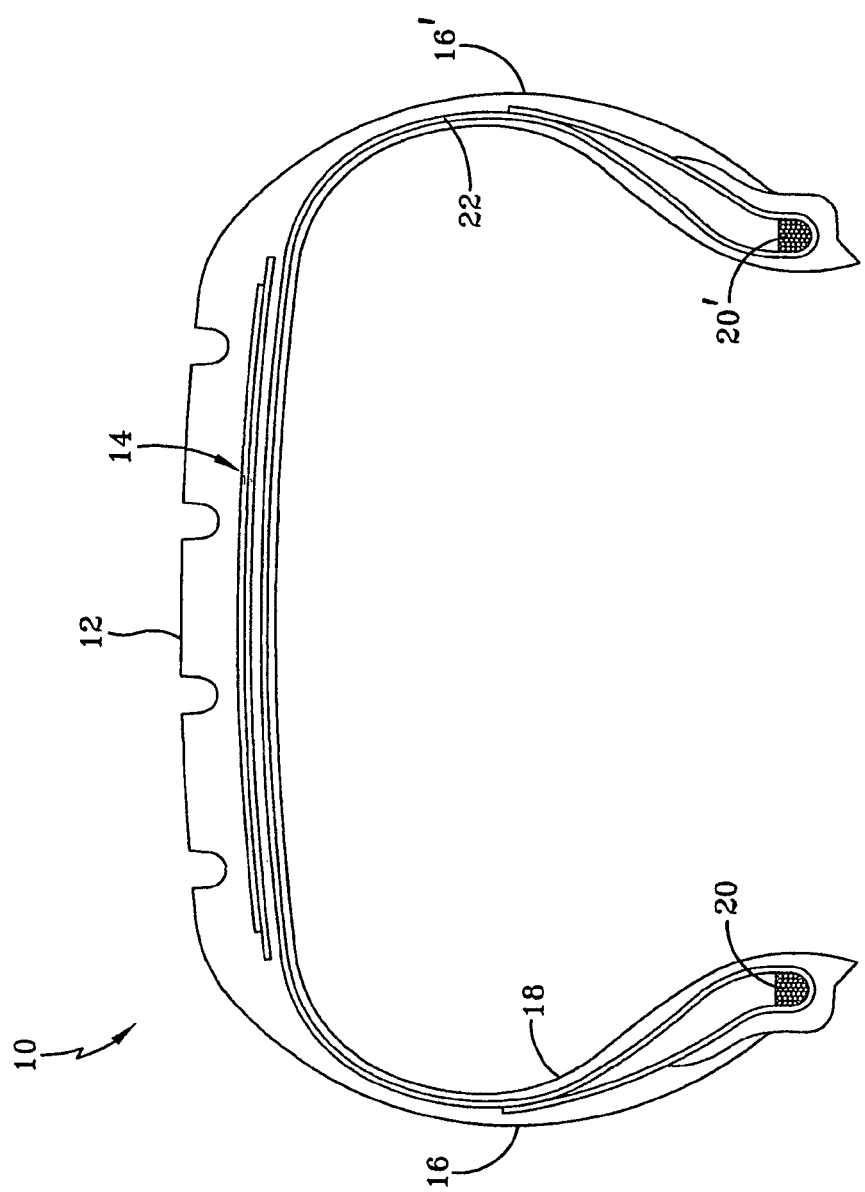

TIRE SIDEWALLS INCLUDING HIGH MOLECULAR WEIGHT WAXES

This application is a National-Stage application of PCT/US2015/066286 filed on Dec. 17, 2015, which claims the benefit of U.S. Provisional Application Ser. No. 62/093,023 filed on Dec. 17, 2014, which are incorporated herein by reference.

FIELD OF THE INVENTION

Embodiments of the present invention are directed toward tire sidewalls including high molecular weight waxes.

BACKGROUND OF THE INVENTION

The art of making tire sidewalls presents unique challenges. In particular, tire sidewalls are susceptible to ozone attack, and when combined with prolonged static and dynamic stresses, cracks and fissures occur. These cracks are typically oriented substantially perpendicular to the direction of the stress, and their propagation under persistent stress can be aesthetically problematic and can even be deleterious to the tire itself.

Conventional technology includes the use of antidegradants that inhibit ozone degradation and thereby slow the formation of cracks. Antidegradants are generally classified as dynamic or static antidegradants. Dynamic antidegradants generally include antiozonants and antioxidants. Static antidegradants include waxes such as petroleum-derived paraffinic and microcrystalline waxes. The use of antidegradants has nonetheless been found to have a deleterious impact on the aesthetics of the tire sidewall. In particular, antidegradants migrate to the surface of the sidewall and leave an unattractive residue or otherwise stain the sidewall.

Therefore, there is a desire to overcome the problems associated with the use of undesirable aesthetic impact of antidegradants while maintaining resistance to ozone attack.

SUMMARY OF THE INVENTION

One or more embodiments of this invention provide a tire sidewall comprising a vulcanized rubber and a high molecular weight wax.

Other embodiments of this invention provide a tire comprising of a sidewall including a vulcanized rubber with reinforcing filler, antiozonant, and from about 2.0 to about 10 parts by weight of a high molecular weight wax dispersed within said vulcanizable rubber.

Yet other embodiments of this invention provide a method for preparing a tire sidewall, the method comprising vulcanizing a green tire sidewall, said green tire sidewall being fabricated from a vulcanizable composition of matter comprising a rubber, from about 5 to about 200 parts by weight filler per 100 parts by weight rubber, from about 0.0025 to about 2.0 parts by weight high molecular weight wax per 100 parts by weight rubber, from about 2.0 to about 10 parts by weight antiozonant per 100 parts by weight rubber, and a curative.

BRIEF DESCRIPTION OF THE DRAWINGS

FIG. 1 is a cross-sectional view of a tire according to one or more embodiments of this invention.

DETAILED DESCRIPTION OF ILLUSTRATIVE EMBODIMENTS

Embodiments of the invention are based, at least in part, on the discovery of a tire sidewall including relatively high molecular weight waxes. While the prior art has employed relatively low molecular weight waxes, the use of high molecular weight waxes has unexpectedly resulted in improved sidewall aesthetics without having a deleterious impact on other properties of the sidewall. In one or more embodiments, tire sidewalls prepared with these waxes are characterized by advantageous color. Embodiments of the invention are therefore directed toward vulcanizable compositions for making tire sidewalls, as well as tire sidewalls with improved color.

Tire Configuration

An example of a tire according to the present invention is shown in FIG. 1, where tire 10 includes a tread portion 12, a belt package 14, a pair of sidewalls 16, 16' an inner liner 18, and a pair of axially spaced bead portions 20, 20'. Ply 22 extends between bead portions 20. In one or more embodiments, sidewalls 16, 16' are formed from sidewall compositions according to aspects of the present invention.

Sidewall Composition

As indicated above, sidewalls of the present invention are prepared from vulcanizable compositions of matter, which may also be referred to as a tire sidewall compound, that include high molecular weight waxes. In one or more embodiments, vulcanizable compositions used to prepare the sidewalls otherwise include conventional ingredients. For example, in one or more embodiments, the sidewall compounds of the present invention include an elastomer, a filler, a curative, and an antidegradant. Other optional ingredients may include cure activators, cure accelerators, oils, resins, plasticizers, pigments, fatty acids, zinc oxide, and peptizing agents.

Rubber

In one or more embodiments, the rubber, which may also be referred to as a vulcanizable rubber or elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms. In particular embodiments, the sidewall compounds of the present invention include a blend of natural rubber and synthetic diene rubber such as polybutadiene. In other embodiments, the sidewall compounds of the present invention include olefinic rubber such ethylene-propylene-diene rubber (EPDM).

Filler

The filler may include one or more conventional reinforcing or non-reinforcing fillers. For example, useful fillers include carbon black, silica, alumina, and silicates such as calcium, aluminum, and magnesium silicates.

In one or more embodiments, carbon blacks include furnace blacks, channel blacks, and lamp blacks. More specific examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

In particular embodiments, the carbon blacks may have a surface area (EMSA) of at least 20 $m^2/g$, in other embodiments at least 35 $m^2/g$, in other embodiments at least 50 $m^2/g$, in other embodiments at least 60 $m^2/g$; surface area values can be determined by ASTM D-1765 using the cetyltrimethylammonium bromide (CTAB) technique. In particular embodiments, the sidewalls include carbon black filler having a surface area (EMSA) of from about 60 to about 110 $m^2/g$. The carbon blacks may be in a pelletized form or an unpelletized flocculent form. The preferred form of carbon black may depend upon the type of mixing equipment used to mix the rubber compound.

In one or more embodiments, the filler may include silica. When silica is used as a filler, the silica may be employed in conjunction with a coupling agent. In these or other embodiments, the silica may be used in conjunction with a silica dispersing agent.

In one or more embodiments, useful silicas include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas that may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

In one or more embodiments, the pH of silica may be from about 5 to about 7 or slightly over 7, or in other embodiments from about 5.5 to about 6.8.

In one or more embodiments, useful silica coupling agents include sulfur-containing silica coupling agents. Examples of sulfur-containing silica coupling agents include bis(trialkoxysilylorgano)polysulfides or mercapto-organoalkoxysilanes. Types of bis(trialkoxysilylorgano) polysulfides include bis(trialkoxysilylorgano)disulfide and bis(trialkoxysilylorgano)tetrasulfides. Exemplary silica dispersing aids include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler.

Curative

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. In one or more embodiments, the curative is sulfur. Examples of suitable sulfur vulcanizing agents include "rubberrmaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like.

Dynamic Antidegradants

In one or more embodiments, dynamic antidegradants may include antioxidants and antiozonants. In particular embodiments, the sidewall compounds of this invention include both an antioxidant and an antiozonant.

In one or more embodiments, useful antioxidants include substituted phenols, diphenyl amine-acetone reaction products, 2,2,2-trimethyl-1,2-dihydroquinoline polymer (TMQ), and tri(nonophenyl)phosphite.

In one or more embodiments, useful antiozonants include amines such as N,N-disubstituted-p-phenylene diamines. These diamines may include both symmetrical and asymmetrical compounds. Useful symmetrical diamines include N,N-dialkyl-p-phenylene diamine. Useful asymmetrical diamines include N-alkyl, N'-aryl-p-phenylene diamines such as N-(1,3-dimethylbutyl)-N'-phenyl-p-phenylene diamine (6PPD) and N-isopropyl-N'-phenyl-p-phenylene diamine.

High Molecular Weight Waxes

The waxes employed in the practice of the present invention, which may be referred to as high molecular weight waxes, may be distinguished from those waxes employed in the prior art sidewalls based upon one or more characteristics.

In one or more embodiments, the high molecular weight waxes employed in the present invention may be characterized by the number of carbon atoms in the molecular chains. In one or more embodiments, at least 90 weight % of the high molecular weight wax molecules have at least 32 carbon atoms, in other embodiments at least 34 carbon atoms, and in other embodiments at least 36 carbon atoms per chain. In these or other embodiments, at least 90 weight % of the high molecular weight wax molecules have from about 32 to about 70, in other embodiments from about 34 to about 65, and in other embodiments from about 36 to about 60 carbon atoms per chain.

In these or other embodiments, the high molecular weight waxes employed in the present invention may be characterized by the peak molecular weight. As those skilled in the art appreciate, peak molecular weight refers to the molecular weight of the highest peak. In one or more embodiments, the high molecular weight waxes employed in the present invention may have a peak molecular weight of at least 500 g/mol, in other embodiments at least 700 g/mol, in other embodiments at least 900 g/mol, in other embodiments at least 1,000 g/mol, and in other embodiments at least 1,100 g/mol. In these or other embodiments, the high molecular weight waxes employed in the present invention may have a peak molecular weight of from about 500 to about 1,300, in other embodiments from about 520 to about 1,200, and in other embodiments from about 540 to about 1,100 g/mol.

In these or other embodiments, the high molecular weight waxes employed in the present invention may be characterized based upon the weight percentage of linear molecules. In one or more embodiments, the high molecular weight waxes employed in the present invention may be characterized in that at least 65 weight %, in other embodiments at least 70 weight %, and in other embodiments at least 75 weight % of the molecules are linear. In these or other embodiments, from about 65 to about 90, in other embodiments from about 70 to about 88, and in other embodiments from about 75 to about 85 weight % of the high molecular weight wax molecules are linear.

In one or more embodiments, the high molecular weight waxes employed in the present invention may be characterized by their Mettler drop point, which the skilled person understands can be determined by ASTM D3954. In one or more embodiments, the Mettler drop point is at least 80° C., in other embodiments at least 90° C., and in other embodiments at least 100° C. In these or other embodiments, the high molecular weight waxes employed in the present invention may be characterized by a Mettler drop point of from about 80 to about 135, in other embodiments from about 85 to about 130, and in other embodiments from about 90 to about 120° C.

In one or more embodiments, the high molecular weight waxes employed in the present invention may be characterized by their congealing point, which the skilled person understands can be determined by ASTM D938. In one or more embodiments, the congealing point is at least 80° C., in other embodiments at least 90° C., and in other embodiments at least 100° C. In these or other embodiments, the high molecular weight waxes employed in the present invention may be characterized by a congealing point of from about 80 to about 120, in other embodiments from about 90 to about 115, and in other embodiments from about 100 to about 110° C.

In one or more embodiments, the high molecular weight waxes employed in the present invention may be characterized by their penetration at 25° C., which the skilled person understands can be determined by ASTM D1321. In one or more embodiments, the penetration at 25° C. is less than 10 1/10 mm, in other embodiments less than 5 1/10 mm, in other embodiments less than 3 1/10 mm, and in other embodiments less than 1 1/10 mm.

In one or more embodiments, the high molecular weight waxes employed in the practice of this invention include those waxes prepared by polymerizing natural gas using Fischer-Tropsch processes. Useful waxes are commercially available. For example, useful waxes can be obtained under the tradenames H1, C105, and C80 (Sasol). In other embodiments, the high molecular weight waxes may derive from petroleum sources.

Other Ingredients

Other ingredients that are typically employed in rubber compounding may also be added to the rubber compositions. These include oils, plasticizer, waxes, scorch inhibiting agents, processing aids, zinc oxide, tackifying resins, reinforcing resins, fatty acids such as stearic acid, and peptizers. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Ingredient Amounts

Rubber

In one or more embodiments, the vulcanizable compositions include at least 20, in other embodiments at least 30, and in other embodiments at least 40 percent by weight of the rubber component, based upon the entire weight of the composition. In these or other embodiments, the vulcanizable compositions include at most 90, in other embodiments at most 70, and in other embodiments at most 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

As suggested above, in certain embodiments of the invention, the rubber component includes (an in certain embodiments consists of) natural rubber and a synthetic diene rubber (e.g. polybutadiene). In one or more of these embodiments, the weight ratio of natural rubber to synthetic diene rubber may be from 0.4:1 to 1.5:1, in other embodiments from 0.6:1 to 1.3:1, and in other embodiments from 0.8:1 to 1.2:1.

Filler

In one or more embodiments, the vulcanizable compositions include at least 5, in other embodiments at least 25, and in other embodiments at least 40 parts by weight (pbw) filler (e.g. carbon black) per 100 parts by weight rubber (phr). In these or other embodiments, the vulcanizable composition includes at most 200, in other embodiments at most 120, and in other embodiments at most 70 pbw of the filler phr. In one or more embodiments, the vulcanizable composition includes from about 5 to about 200, in other embodiments from about 25 to about 120, and in other embodiments from about 40 to about 70 pbw of filler phr.

Dynamic Antidegradants

In one or more embodiments, the vulcanizable compositions of this invention include at least 4.0, in other embodiments at least 4.4, in other embodiments at least 4.8 parts by weight (pbw) total dynamic antidegradant (e.g. antioxidant and/or antiozonant) per 100 parts by weight rubber (phr). In these or other embodiments, the vulcanizable composition includes at most 20, in other embodiments at most 16, and in other embodiments at most 12 pbw total dynamic antidegradant phr. In one or more embodiments, the vulcanizable composition includes from about 4.0 to about 20, in other embodiments from about 4.4 to about 16, and in other embodiments from about 4.8 to about 12 pbw total dynamic antidegradant phr.

In these or other embodiments, the vulcanizable compositions include at least 2.0, in other embodiments at least 2.2, in other embodiments at least 2.4, in other embodiments at least 2.6, in other embodiments at least 2.8, and in other embodiments at least 3.0 parts by weight (pbw) antioxidant (e.g. TMQ) per 100 parts by weight rubber (phr). In these or other embodiments, the vulcanizable composition includes at most 10, in other embodiments at most 8, and in other embodiments at most 6 pbw of antioxidant phr. In one or more embodiments, the vulcanizable composition includes from about 2.0 to about 10, in other embodiments from about 2.2 to about 8, and in other embodiments from about 2.4 to about 6 pbw of antioxidant phr.

In these or other embodiments, the vulcanizable compositions include at least 2.0, in other embodiments at least 2.2, in other embodiments at least 2.4, in other embodiments at least 2.6, in other embodiments at least 2.8, and in other embodiments at least 3.0 parts by weight (pbw) antiozonant (e.g. 6PPD) per 100 parts by weight rubber (phr). In these or other embodiments, the vulcanizable composition includes at most 10, in other embodiments at most 8, and in other embodiments at most 6 pbw of antiozonant phr. In one or more embodiments, the vulcanizable composition includes from about 2.0 to about 10, in other embodiments from about 2.2 to about 8, and in other embodiments from about 2.4 to about 6 pbw of antiozonant phr.

High Molecular Weight Waxes

In one or more embodiments, the vulcanizable compositions include at least 2.0, in other embodiments at least 2.2, in other embodiments at least 2.4, in other embodiments at least 2.6, and in other embodiments at least 2.8 parts by weight (pbw) high molecular weight wax per 100 parts by weight rubber (phr). In these or other embodiments, the vulcanizable composition includes at most 10, in other embodiments at most 8, in other embodiments at most 6, in other embodiments at most 5 pbw of high molecular weight wax phr. In one or more embodiments, the vulcanizable composition includes from about 2.0 to about 10, in other embodiments from about 2.2 to about 8, and in other embodiments from about 2.2 to about 6 pbw high molecular weight wax phr.

Cure System

The skilled person will be able to readily select the amount of vulcanizing agents to achieve the level of desired cure. Also, the skilled person will be able to readily select the amount of cure accelerators to achieve the level of desired cure.

Mixing Procedure

All ingredients of the rubber compositions can be mixed with standard mixing equipment such as Banbury or Brabender mixers, extruders, kneaders, and two-rolled mills. As suggested above, the ingredients are mixed in two or more stages. In the first stage (i.e., mixing stage), which typically includes the rubber component and filler, is prepared. To prevent premature vulcanization (also known as scorch), vulcanizing agents. Once the masterbatch is prepared, the vulcanizing agents may be introduced and mixed into the masterbatch in a final mixing stage, which is typically conducted at relatively low temperatures so as to reduce the chances of premature vulcanization. Additional mixing stages, sometimes called remills, can be employed between the masterbatch mixing stage and the final mixing stage.

Preparation of Tire

The compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as the high molecular weight waxes, as well as the fillers and processing aids, may be evenly dispersed throughout the crosslinked network. In particular embodiments, one or more of the compound ingredients may become crosslinked or otherwise chemically bonded to the crosslinked rubber network. As the skilled person will appreciate, the amounts of the various ingredients, especially those that do not react, will remain within the cured tire component the same as they existed within the compound.

Pneumatic tires can be made as discussed in U.S. Pat. Nos. 5,866,171, 5,876,527, 5,931,211, and 5,971,046, which are incorporated herein by reference. For example, the various tire components can be prepared as green tire components (i.e., uncured tire components), and assembled into a green tire. The green tire can then be subjected to curing conditions to form a vulcanized tire wherein the various green components are generally adhered to one another through the vulcanization process.

Characteristics of Tire Sidewall

In one or more embodiments, the tire sidewalls of the present invention are characterized by an advantageous balance of properties. In particular embodiments, the tire sidewalls are characterized by an advantageous balance between resistance to dynamically-strained ozone-induced crack growth and an advantageous color.

In one or more embodiments, ozone resistance, which for purposes of this specification may refer to resistance to ozone-induced crack formation under strain, may be determined quantitatively by ASTM D-1149.

In combination therewith, in one or more embodiments, color can be quantified by using a spectrophotometer device, which reports measurements in the CIE LAB color space as recognized by the International Commission on Illumination. For example, color and gloss may be determined by using a Minolta CM2600D Spectrophotometer, calibrated according to the manufacturer's standards. For the static ozone testing, samples are typically exposed to 100 parts ozone per hundred million air at a temperature of 60° C.+1° C. for 7 days while statically strained. For this purpose, an ozone box, OREC model 0500/DM100 and ozone monitor, ®OREC model O3DM100 may be employed. The measurements, L, a, and b, describe 3 axes, and identify a unique color. The vector difference between two colors, dE, can be calculated as follows:

$$dE=V((L1-L2)2+(a1-a2)2+(b\ b2)2)$$

The skilled person recognizes that b* is indicative of yellow, which is believed to be attributable to antiozonants (such as 6PPD), and therefore lower b* is desired. In one or more embodiments, the b* of the tire sidewalls of the present invention is lower than 10, in other embodiments lower than 5, and in other embodiments lower than 3.

Various modifications and alterations that do not depart from the scope and spirit of this invention will become apparent to those skilled in the art. This invention is not to be duly limited to the illustrative embodiments set forth herein.

What is claimed is:

1. A tire sidewall comprising:
   a. a vulcanized rubber;
   b. a high molecular weight wax, where the high molecular weight wax is characterized in that at least 90 weight % of the wax molecules have from 32 to about 70 carbon atoms and wherein the high molecular weight wax is characterized by a peak molecular weight of at least 500 g/mol;

c. a dynamic antioxidant, where the tire sidewall includes at least 2.0 parts by weight dynamic antioxidant per 100 parts by weight rubber, and where the dynamic antioxidant is at least one of substituted phenol, diphenyl amine-acetone reaction products, 2,2,2-trimethyl-1,2-dihydroquinoline polymer, and tri(nonophenyl)phosphite; and d. a dynamic antiozonant, where the tire sidewall includes at least 2.0 parts by weight dynamic antiozonant per 100 parts by weight rubber, and where the dynamic antiozonant is one of N,N-dialkyl-p-phenylene diamine, N-(1,3-dimethylbutyl)-N'-phenyl-p-phenylene diamine and N-isopropyl-N'-phenyl-p-phenylene diamine.

2. The tire sidewall of claim 1, where the tire sidewall includes at least 2.0 parts by weight and at most 10 parts by weight high molecular weight wax per 100 parts by weight rubber.

3. The tire sidewall of claim 1, where the tire sidewall includes at least 2.2 parts by weight and at most 8 parts by weight high molecular weight wax per 100 parts by weight rubber.

4. The tire sidewall of claim 1, where the vulcanized rubber includes the vulcanized product of natural rubber and a synthetic polydiene.

5. The tire sidewall of claim 4, where the weight ratio of natural rubber to synthetic polydiene is from 0.4:1 to 1.5:1.

6. The tire sidewall of claim 1, where the vulcanized rubber includes the vulcanized product of ethylene-propylene-diene rubber.

7. The tire sidewall of claim 1, where the high molecular weight wax is characterized in that at least 65 weight % of the wax molecules are linear.

8. The tire sidewall of claim 1, where the high molecular weight wax is characterized by a Mettler drop point of at least 80° C.

9. The tire sidewall of claim 1, where the high molecular weight wax is characterized by a congealing point of at least 80° C.

10. The tire sidewall of claim 1, where the high molecular weight wax is characterized by a penetration at 25° C. of less than 10¹/₁₀ mm.

11. The tire sidewall of claim 1, where the high molecular weight wax is dispersed throughout said vulcanized rubber.

12. The tire sidewall of claim 1, further comprising about 5 to about 200 parts by weight filler per 100 parts by weight rubber.

13. The tire sidewall of claim 12, where the tire sidewall includes from about 2 to about 10 parts by weight of the dynamic antioxidant per 100 parts by weight rubber.

14. The tire sidewall of claim 13, where the tire sidewall includes from about 2 to about 10 parts by weight of the dynamic antiozonant per 100 parts by weight rubber.

15. A tire comprising the tire sidewall of claim 14.

16. A method for preparing the tire sidewall of claim 1, the method including vulcanizing a green sidewall, where said green sidewall is fabricated from a vulcanizable composition of matter including a vulcanizable rubber, the high molecular wax, the dynamic antioxidant, and the dynamic antiozonant.

* * * * *